United States Patent [19]

Chitayat et al.

[11] Patent Number: 4,494,060

[45] Date of Patent: Jan. 15, 1985

[54] AXIS CONTROLLER FOR ROBOTIC ACTUATOR

[75] Inventors: Anwar Chitayat, Northport; Robert C. Goldstein, Patchogue; Mustansir A. Faizullabhoy, Stony Brook, all of N.Y.

[73] Assignee: Anorad Corporation, Hauppauge, N.Y.

[21] Appl. No.: 471,237

[22] Filed: Mar. 2, 1983

[51] Int. Cl.³ .............................................. G05B 19/42
[52] U.S. Cl. ..................................... 318/568; 318/632; 318/603; 318/618; 318/608; 364/174; 364/178; 364/513
[58] Field of Search ............... 364/153, 174, 178, 513, 364/118; 318/632, 568, 615-618, 603, 574, 608

[56] References Cited

U.S. PATENT DOCUMENTS

| | | | |
|---|---|---|---|
| 3,917,930 | 11/1975 | Davey et al. | 318/632 X |
| 4,140,953 | 2/1979 | Dunne | 318/632 X |
| 4,223,257 | 9/1980 | Miller | 318/594 |
| 4,310,878 | 1/1982 | Hyatt | 318/608 |
| 4,423,365 | 12/1983 | Turner | 318/632 X |
| 4,453,221 | 6/1984 | Davis | 318/568 X |

Primary Examiner—B. Dobeck
Attorney, Agent, or Firm—Thomas R. Morrison

[57] ABSTRACT

A control for a robotic actuator employs a position processor to determine the phase of a pair of electrooptically generated position signals as well as to keep track of the number of whole cycles of the position signals. Whole cycles are tracked using a prediction technique depending upon the continuity of position and velocity. A command processor employing the sensed position produces a velocity signal for driving the robotic actuator. When very slow motion is sensed, the response of the controller is appropriately reduced to maintain a velocity command signal generally in proportion to the motion.

18 Claims, 10 Drawing Figures

4,494,060

AXIS CONTROLLER FOR ROBOTIC ACTUATOR

BACKGROUND OF THE INVENTION

Feedback control systems such as employed in robotic actuators typically employ forward control elements for commanding a position or velocity of an object and feedback elements which produce signals that can be compared with the control systems to determine the direction and magnitude of required actuation of the object. In high precision systems, there is little margin for error in the processing of such feedback signals.

In order to achieve high resolution in positioning, it is necessary to employ fine resolution in the position sensing signals. However, when it is attempted to couple such fine resolution with high actuation speed of the object, a conflict exists because, particularly in a digital processing system, the cycle time for processing the data may exceed the time during which one or more complete cycles of the position sensing system are produced. Thus, if actuation speed is pushed too high, a position ambiguity of one or more complete cycles of the position sensing system may result.

Positioning systems frequently employ a home position sensor to provide a known point to which other positions are referenced. The home position sensor may be a mechanical, magnetic or electrooptic apparatus. In a high precision system, great care must be exercised in finding the exact home position. This process may be hindered by the fact that a home position sensor output may have numerous local maxima and minima and it is necessary to find the extreme one of these and identify it as the actual home position.

Even with a high resolution position sensing device, under conditions of extremely low velocity of the object, one or more complete cycles of position measurement time may ensue before the actual change in position has grown to a value sufficient to be resolved. As soon as the change in position is resolved, the value fed back is instantaneously changed by the one resolvable increment of position. This may tend to provide jerky control of the object since the feedback signal is provided only once per two or more periods of time during which position is measured.

OBJECTS AND SUMMARY OF THE INVENTION

Accordingly, it is an object of the invention to provide an axis controller for a robotic actuator which overcomes the drawbacks of the prior art.

It is a further object of the invention to provide a robotic controller which automatically compensates for bias in position sensing signals.

It is a further object of the invention to provide an axis controller which produces a prediction of position of the robotic actuator which is then compared with a reported or measured position of the axis controller to produce an error signal. The error signal, in turn, is employed to update the prediction and to produce a smoothed position signal which is employed in a command processor to produce velocity commands.

It is a further object of the invention to provide an axis controller for a robotic actuator which reduces the application of a measured velocity signal in relation to the number of previous measurement times during which no motion is sensed.

It is a further object of the invention to provide an axis controller for a robotic sensor which includes an automatic velocity bias compensator to remove a bias component from a velocity command signal so that a zero velocity command signal will accurately result in a zero velocity of the robotic actuator.

According to an aspect of the present invention, there is provided a position processor for a robotic controller of the type employing first and second sensed position signals having a phase relationship, the phase relationship containing information about a position of an object within a cycle of position, the object being movable over a plurality of cycles of position, comprising means for comparing phases of the first and second sensed position signals to produce a reported position within a cycle of position, means for producing a predicted position of the object including full cycles of position and a position within a cycle of position, means for differencing the predicted position within a cycle of position and the reported position to produce a position error signal, and means responsive to the position error signal for accumulating a smoothed position signal representing the position of the object.

According to a further aspect of the present invention, there is provided a command processor for a robotic controller of the type employing a sequence of measurements of position of an object, the measurements being spaced apart a predetermined time, comprising means for differencing a measurement of position and a preceding measurement of position to produce a measured velocity signal, means for producing a velocity command signal, means for differencing the measured velocity signal and the velocity command signal to produce a velocity error signal, the velocity error signal being usable for driving the object, means for counting a number of consecutive ones of the predetermined times during which the measured velocity signal is zero, and means for slowing change of the measured velocity signal in dependence on the number.

According to a feature of the present invention, there is provided a command processor for a robotic controller of the type employing a sequence of measurements of position of an object, the measurements being spaced apart a predetermined time, comprising means for differencing a measurement of position and a preceding measurement of position to produce a measured velocity signal, means for producing a velocity command signal, means for differencing the measured velocity signal and the velocity command signal to produce a velocity error signal, the velocity error signal being usable for driving the object, and a velocity bias compensator effective to sense and store a non-zero value of the measured velocity signal at a time when the velocity command signal should be zero and to subsequently compensate the velocity command signal with the stored value to compensate for velocity bias.

According to a further feature of the present invention, there is provided a home position processor for a robotic controller of the type employing a home position signal for sensing a home position of an object, comprising means for moving the object through a search range containing the home position, means for storing an extreme value of the home position signal, means for comparing a new value of the home position signal with a previously stored extreme value and for replacing the previously stored extreme value with the new value if the new value exceeds the previously stored extreme value, and means for storing a number associated with a position of each new value which is stored, a number stored at the completion of the search range being associated with the most extreme value of the home position signal and representing the home position.

According to a still further feature of the present invention, there is provided a method of determining a home position in a robotic controller of the type employing a home position signal for sensing a home position of an object, comprising moving the object through a search range containing the home position, storing an extreme value of the home position signal, comparing a new value of the home position signal with a previously stored extreme value and replacing the previously stored extreme value with the new value if the new value exceeds the previously stored extreme value. and storing a number associated with a position of each new value which is stored, a number stored at the completion of the search range being associated with the most extreme value of the home position signal and representing the home position.

According to a still further feature of the present invention, there is provided a robotic controller for controlling a position of an object, comprising means for producing first and second position signals related to the position, the first and second position signals having a phase relationship containing information about the position, means responsive to the phase relationship and effective to produce a reported position signal within a cycle of the first and second position signals, means for producing a prediction of the reported position signal, means for differencing the reported position signal and the prediction to produce a position error signal, the means for producing a prediction being responsive to the position error signal for updating the prediction, means responsive to the error signal for accumulating a smoothed position signal, means for differencing a value of the smoothed position signal with a previous value of the smoothed position signal to produce a tach signal, means for slowing changes in the tach signal in response to at least two successive values of the smoothed position signal being the same to produce a corrected tach signal, means for producing a velocity command signal, means for differencing the velocity command signal and the corrected tach signal to produce a velocity error signal, and means responsive to the velocity error signal for driving the object.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The present invention may be employed to control any type of actuator which requires precise positioning of a movable element. For example, the present invention may have application to control of the arm of a manufacturing robot and the like. For concreteness of description, an embodiment of the invention is described hereinbelow applied to the control of the position of a positioning table along an axis. The positioning table described may be one of two or more cooperating positioning tables having orthogonal axes. The table may be, for example, a positioning table such as disclosed in U.S. Pat. No. 4,013,280 in which a table is driven along an axis by a DC motor.

Figure 1:
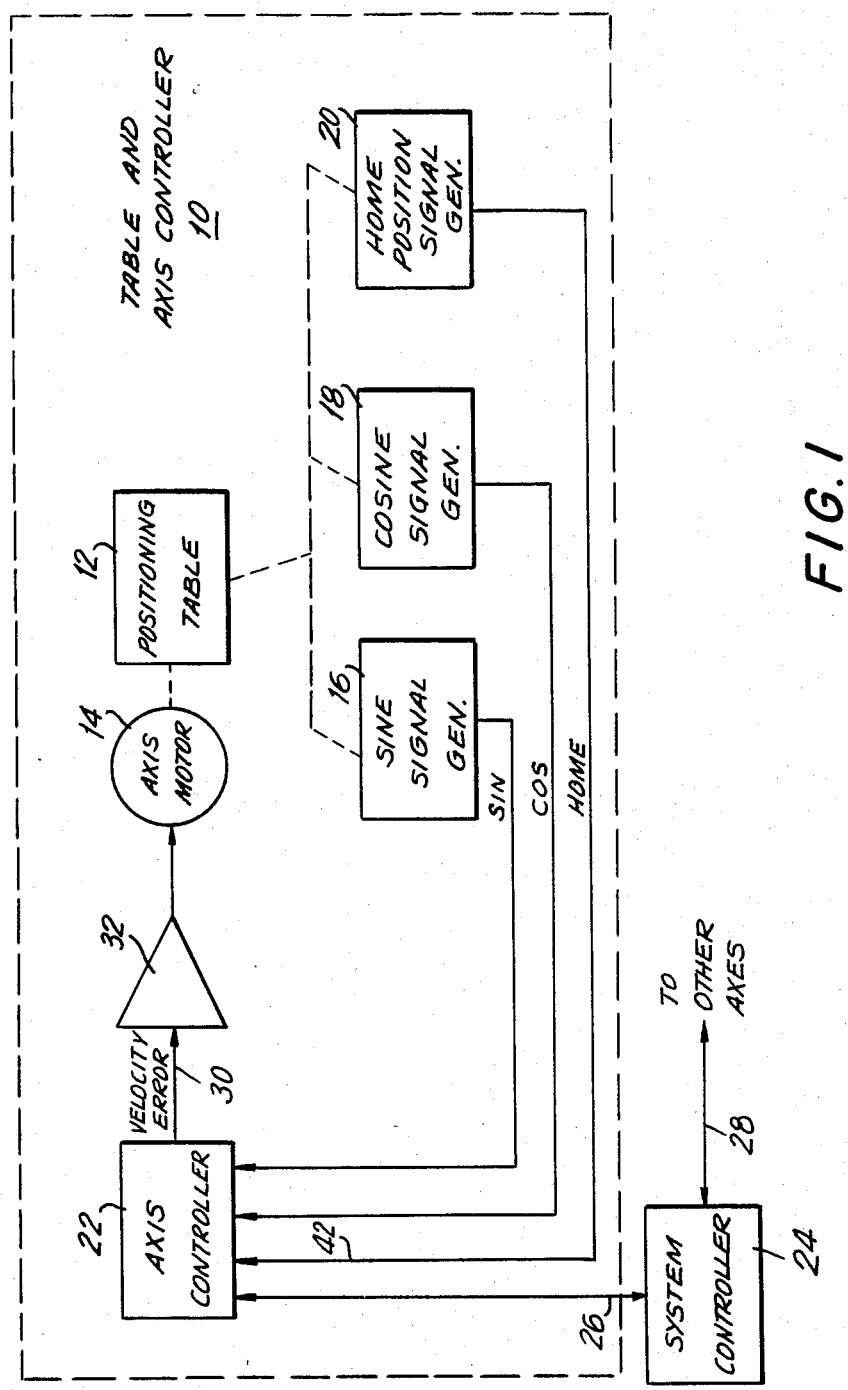
FIG. 1 is a simplified overall system diagram of a system employing at least one table and axis controller according to an embodiment of the present invention.

Referring now to FIG. 1, a table and axis controller, shown generally at 10, includes a positioning table 12 driven along its axis by a DC axis motor 14. Motion of positioning table 12 is mechanically coupled to a sine signal generator 16, a cosine signal generator 18 and a home position signal generator 20. Although any type of position signal generator may be employed, an electrooptical signal generator is preferred in which a scale having closely spaced opaque lines separated by transparent portions is affixed for motion with the table. A stationary graticle having lines and transparent portions having the same spacing as those on the scale is positioned adjacent the scale. A collimated light source and an optical sensor are positioned at opposite sides of the scale and graticle combination. The optical sensor detects the light passing through the combination of scale and graticle. The sine and cosine signals from sine signal generator 16 and cosine signal generator 18 preferably vary sinusoidally with a 90° difference in phase. The sine signal leads the cosine signal during motion in one direction and lags during motion in the other direction.

Home position signal generator 20 is employed in a home search sequence to initialize position circuits in the apparatus as will be explained.

An axis controller 22 receives the sin, cos and home signals from sine signal generator 16, cosine signal generator 18 and home position signal generator 20. In addition, a system controller 24 which may include, for example, a central processor, keyboard, manual controls and the like, provides overall guidance commands to axis controller 22 on a line 26. System controller 24, external to table and axis controller 10, may be shared by other axes and may provide control signals to these other axes on one or more additional lines 28. For the purposes of the present application, it may be assumed that the other axes are identical to table and axis controller 10 and illustration and description thereof are, therefore, omitted.

In response to its inputs, axis controller 22 produces a velocity error signal on a line 30 which is applied to an amplifier 32 and thence to axis motor 14 for control of positioning table 12. Thus, it can be seen that a closed positioning loop is achieved wherein the forward control is provided by axis controller 22, amplifier 32 and axis motor 14 and the feedback is provided by sine signal generator 16, cosine signal generator 18 and home position signal generator 20.

Figure 2:
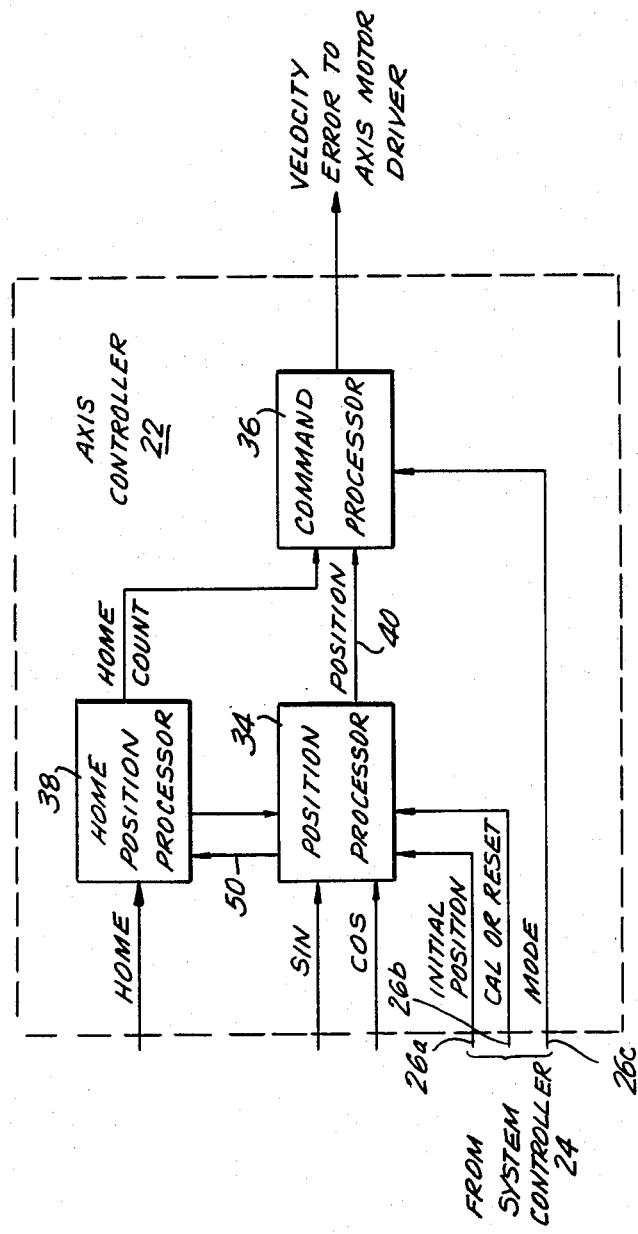
FIG. 2 is a simplified block diagram of an axis controller of FIG. 1.

Referring now to FIG. 2, axis controller 22 contains a position processor 34, a command processor 36 and a home position processor 38. Position processor 34 compares the phase of the sin and cos signals applied thereto and produces a position signal on a line 40 which is applied to command processor 36. It will thus be seen that the position signal on line 40 specifies the table position within one cycle of the sin and cos input signals. However, if positioning table 12 moves further than one cycle, ambiguous sets of position signals are applied to line 40. In order to remain updated on the actual table position, command processor 36 must keep track of the cycles as well as the fractional cycles of the position signals. For this reason, home position processor 38 is employed to provide a reference signal corresponding to a precisely known location of positioning table 12 which permits initialization of the position value stored in command processor 36.

Position processor 34 receives control signals on lines 26a and 26b for controlling the initialization, calibration or reset at appropriate times in the operation of the apparatus. In addition, command processor 36 receives a mode signal on a line 26c to control the type of command program which is employed.

Figure 3:
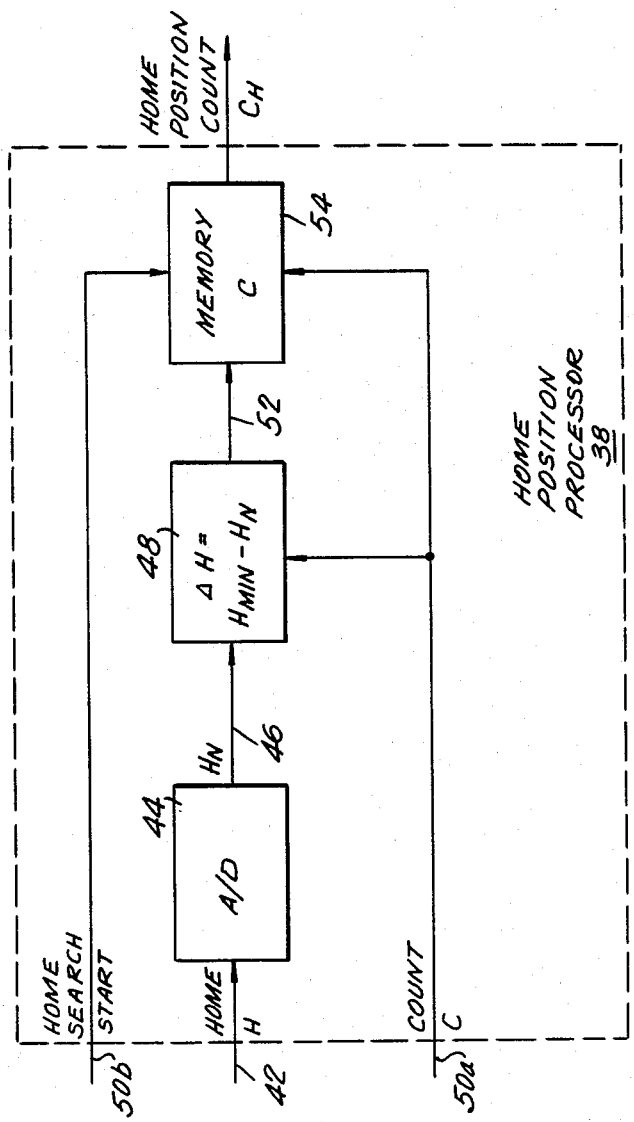
FIG. 3 is a block diagram of a home position processor according to an embodiment of the present invention.

Referring now to FIG. 3, home position processor 38 receives the analog home signal H on a line 42 in an analog-to-digital converter 44. The digitized sample during clock period N, shown as $H_N$, is applied on a line 46 to a subtractor 48. Counts are applied on a line 50a to subtractor 48 to define sample points. At each change in count C, subtractor 48 determines the difference between the present sample $H_N$ of the digitized home signal and the minimum value $H_{MIN}$ previously determined. If the value of the present sample $H_N$ is lower than $H_{MIN}$, an enable signal is applied on a line 52 to a memory 54 which enables memory 54 to store the value of count C existing at that time and to erase any previously stored value of count C. At the end of a home search period, the number $C_H$ stored in memory 54 represents the count which existed at the time the home signal H on line 42 was at its most negative point.

Figure 4:
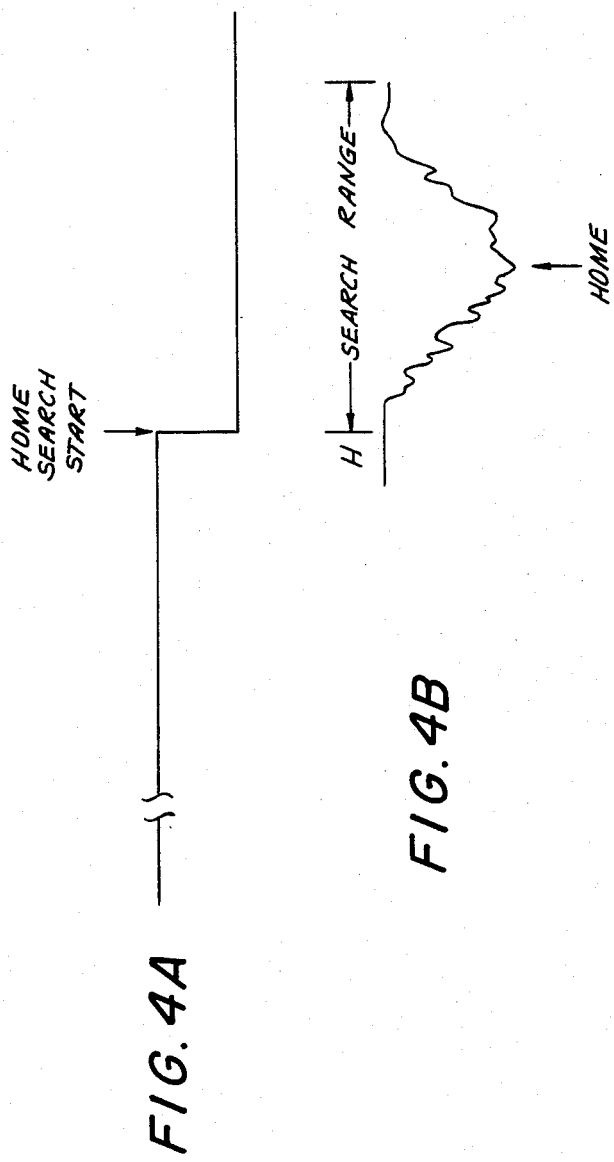
FIGS. 4A and 4B are curves to which reference will be made in describing the operation of the home position processor of FIG. 3.

Referring now to FIGS. 4A and 4b, in the home sequence, positioning table 12 is driven rapidly to a home search start point (FIG. 4A) at which a signal transition is experienced which may be produced, for example, by a light emitting diode on the scale which is revealed to a photodetector at the home search start point. Upon receiving the home search start signal, the table is driven at slow speed far enough to the right of the home search start point to be certain to cover the range including the actual home position. For example, depending on the memory capacity in table and axis controller 10, table 12 may be driven as far as, for example, an inch, which may represented by, for example, 64,000 increments. From FIG. 4B, it can be seen that a large number of local minima may exist in the home signal H. As each lower minimum is sensed, the previous minimum is discarded and the new lower one is stored along with the count from home search start accompanying it. When positioning table 12 is driven to the end of the search range, the minimum signal stored in subtractor 48 (FIG. 3) represents the value at the home position and the count stored in memory 54 is the home position count $C_H$ which existed at the home position.

Figure 5:
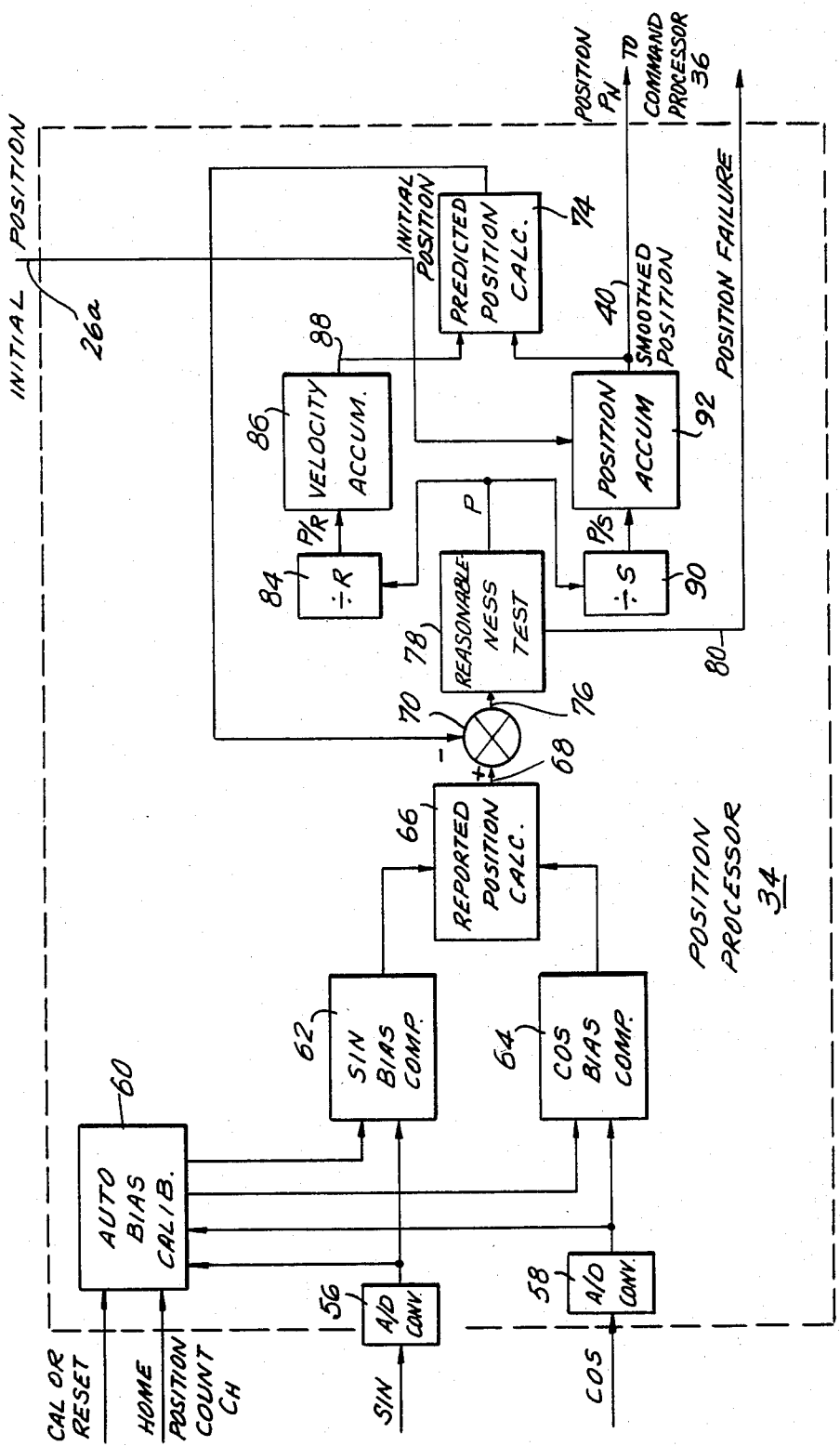
FIG. 5 is a block diagram of a position processor of FIG. 2.

Referring now to FIG. 5, position processor 54 receives the analog sin and cos signals at analog-to-digital converters 56 and 58. The digital outputs of A/D converters 56 and 58 are applied to an automatic bias calibration circuit 60. In addition, the digitized output of sin A/D converter 56 is applied to a sin bias compensation circuit 62. Similarly, the digital output of cos A/D converter 58 is applied to a cos bias compensation circuit 64.

Automatic bias calibration circuit 60, either in response to the home position count $C_H$ or a calibration or reset signal produces a pair of digital values which are applied respectively to sin bias compensation circuit 62 and cos bias compensation circuit 64. The bias compensation values employed are appropriately added to, or subtracted from, the digitized sin and cos signals from A/D converters 56 and 58 so that any bias in the signals is removed. The resulting corrected sin and cos values are applied to a reported position calculator 66.

Reported position calculator 66 compares the phases of its two input signals and produces an output on a line 68 which defines the phase position of positioning table 12. Although any appropriate resolution may be employed, in the preferred embodiment, the output of reported position calculator 66 may have 128 phase positions per cycle of the inputs.

In order to avoid problems which may arise due to unequal magnitudes of the sin and cos signals, reported position calculator 66 employs a ratio of the sin and cos signals as follows:

$$\text{Reported position} = \frac{|\cos|}{|\sin| + |\cos|}$$

In the above calculation of reported position, since absolute values are employed, the calculation does not give the quadrant but only the angular position within a quadrant. The signs of the sin and cos signals are examined to determine the actual angular position as follows:

| SIGN | | QUADRANT | ANGULAR RANGE° |
|---|---|---|---|
| SIN | COS | | |
| + | + | 1st | 0–90° |
| + | − | 2nd | 90–180° |
| − | − | 3rd | 180–270° |
| − | + | 4th | 270–360° |

With appropriate digital processing, it is possible to produce 32 discrete phase values per quadrant. Thus, if a scale is employed for the sin and cos signal generators 16 and 18 having 500 lines per inch, a resolution of 1/64,000 inch is attainable.

The digital value representing reported position is applied to a minus input of an adder 70.

If positioning table 12 is moving very fast, it is possible for more than one cycle of the sine and cosine signal generators 16 and 18 to have been travelled during a basic cycle time of the digital processing. That is, if positioning table 12 is moving at several inches per second with a scale resolution of 500 lines per inch, several thousand cycles of the position signals may occur per second. That is, the reported position on line 68 fed to adder 70 may go through one or more complete multiples of 128 units plus a fraction of a unit. The elements to the right of adder 70 in FIG. 5 are employed to overcome such possible ambiguity and to produce a smoothed position signal as will be explained.

Figure 6:
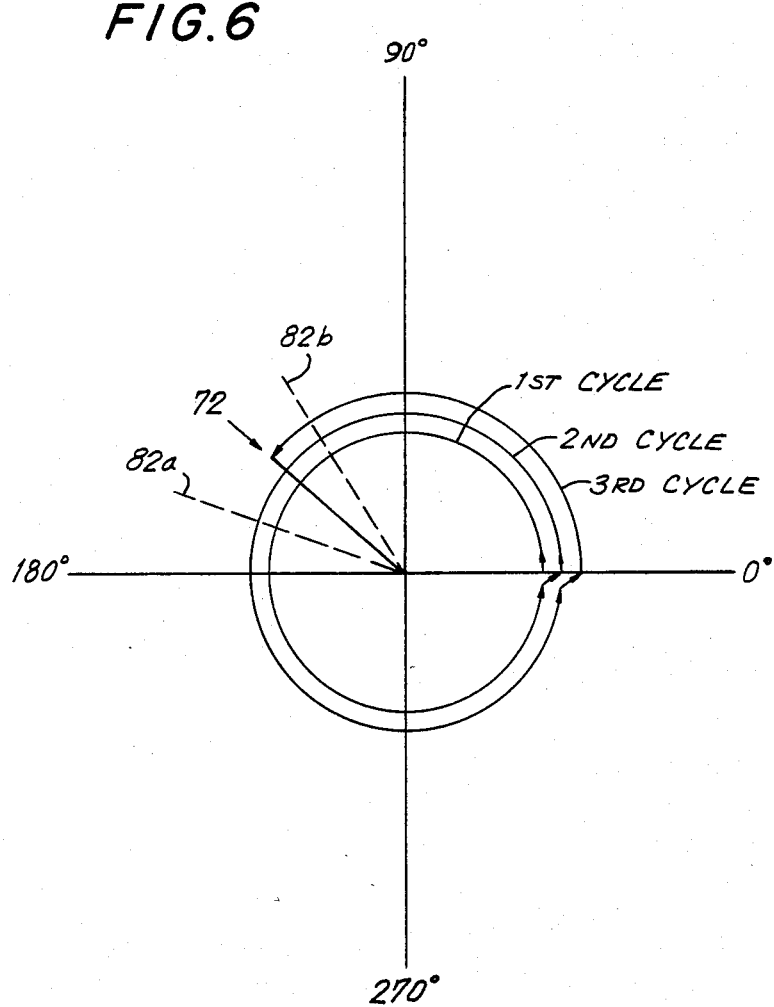
FIG. 6 is a chart to which reference will be made in describing the manner in which prediction overcomes position ambiguity due to intervening whole cycles of motion.

Referring momentarily to FIG. 6 to explain the prediction technique, the angular positions of the sensing scale is represented in conventional trigonometric fashion as a circle defined by the changing phases of the sin and cos signals. That is, as each line on the position sensing scale is traversed, a full cycle of the sin and cos signals are produced. In FIG. 6, the situation is shown in which two complete cycles and a partial third cycle are traversed before the measurement of reported position is made at an angular position 72. In an angular sense, a total angular range of two times 360° plus 130°=850° is traversed by the sensing signal. The applicant relies on the fact that a speed which can cover two, three and more sensing cycles is not reached instantaneously. That is, the change in speed between measurements is not a step function and may be subject to prediction. In fact, the applicant has found that, with the apparatus of FIG. 5, it is possible to maintain a prediction of angular position that can keep the system updated as to the actual angular position including the intervening full cycles without losing track of actual position.

Referring again to FIG. 5, a predicted position calculator 74 produces a prediction of angular position 72 (FIG. 6) which is applied to the minus input of adder 70. The difference signal is applied on a line 76 to a reasonableness test circuit 78 which checks to see whether the error between the predicted and reported positions exceeds a predetermined value. If the difference is unreasonable, that is, exceeds a predetermined value for N consecutive tests, a position failure signal is applied on a line 80 which informs system controller 24 (FIG. 1) that the position for this axis is not dependable. The size of the reasonableness boundary as well as the number of consecutive tests before the assumption of position failure may be empirically determined. In an embodiment of the invention in which each cycle is digitally divided into 128 parts, it was empirically determined that a predetermined value of ±16 counts (±⅛ of a cycle) may be used for a test of reasonableness. Such reasonableness boundaries are shown at 82a and 82b in FIG. 6. In addition, in the preferred embodiment, the number of consecutive samples N failing the reasonableness test is chosen to be equal to two. Other reasonableness boundary limits and number of consecutive test failures before a position failure signal is generated may be employed by one skilled in the art.

If the error signal fed to reasonableness test circuit 78 passes the reasonableness test, this position error signal P is applied to a first ratio circuit 84 which divides the error signal P by a factor R and applies the ratio to a velocity accumulator 86. Velocity accumulator 86 updates a velocity signal stored therein according to the ratioed position error to produce a prediction of current velocity which would account for the reported error. This velocity error is applied on a line 88 to predicted position calculator 74.

Ratio R applied by ratio circuit 84 may be determined by one skilled in the art either analytically or empirically. In the preferred embodiment, a ratio of 4 was determined to produce an adequate velocity prediction. That is, the position error P is divided by 4 in ratio circuit 84.

The position error signal P is applied to a second ratio circuit 90 where it is divided by a factor S and applied to a position accumulator 92. Position accumulator 92 updates its previous position according to the ratioed position error signal P/S to produce a smoothed position signal $P_N$ which is applied on line 40 to predicted position calculator 74 and to command processor 36. Predicted position calculator 74, using the present position at one of its inputs and the velocity at its other input is capable of predicting the position of the positioning table at the end of the ensuing cycle within the bounds set by the reasonableness test.

An initial position signal may be applied on a line 26a from system controller 24 (FIG. 1) which may be either arbitrarily selected or may be determined through the home search process or some other basis. For example, the operator of the apparatus may arbitrarily select a position at which the positioning table currently rests as a zero position for some purpose. In this circumstance, the initial position signal on line 26a sets the value of position accumulator 92 to zero. This, in essence, introduces a deliberate bias in all calculations of smoothed position applied to command processor 36 and predicted position calculator 74.

The ratio applied to the position error signal P in ratio circuit 90 may be analytically or empirically derived. In the preferred embodiment, a ratio of 2 is applied so that the error signal applied to position accumulator 92 is divided by 2 before being employed in updating the previously stored position.

Figure 7:
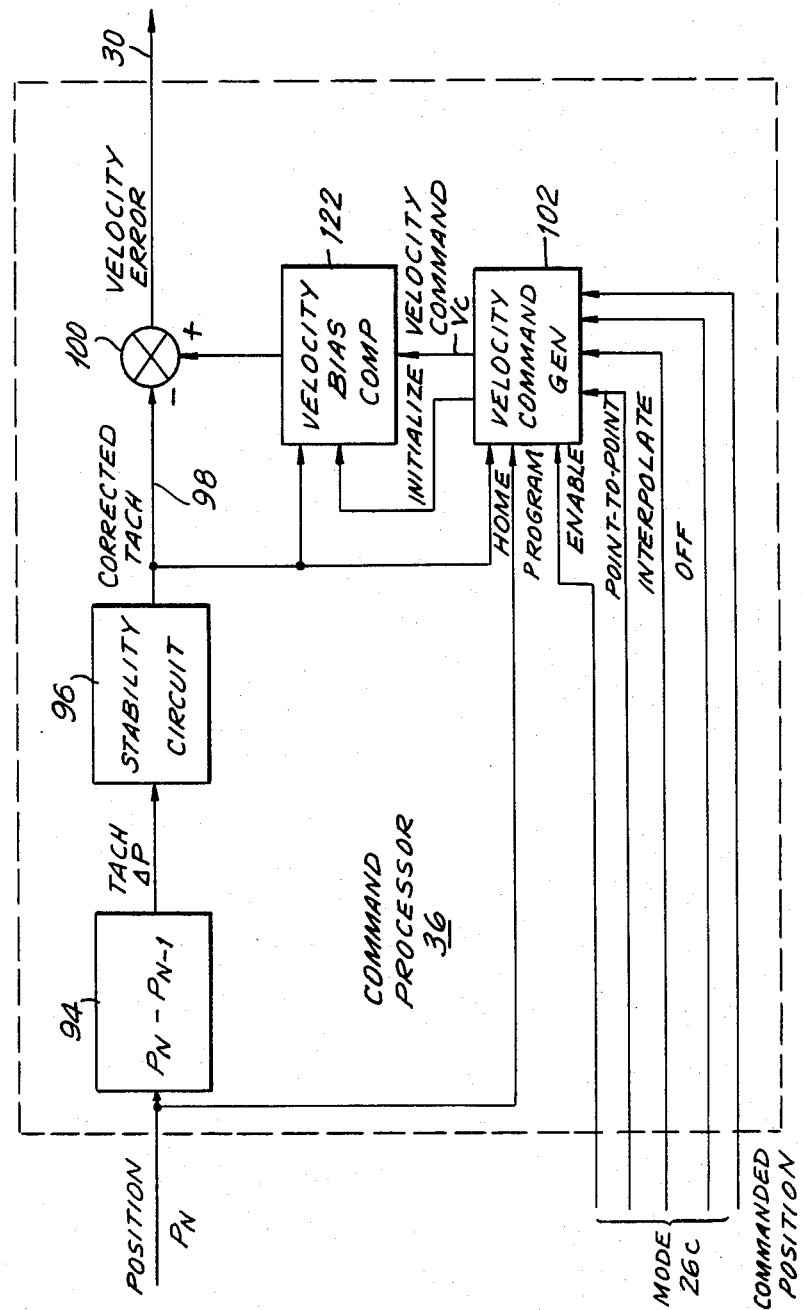
FIG. 7 is a block diagram of a command processor of FIG. 2.

Referring now to FIG. 7, the smoothed position signal from the Nth calculating cycle produced by position processor 34 is applied to a tachometer calculating circuit 94. Tachometer calculating circuit 94 determines the difference between the present position signal $P_N$ and the position signal produced in the preceding cycle $P_{N-1}$ to produce a tach difference $\Delta P$ which is applied to a stability circuit 96. Stability circuit 96, to be described in greater detail hereinafter, is employed to slow the response of command processor 36 during motion that is so slow that it is not discriminable during one or more measurement cycles. Stability circuit 96 produces a corrected tach signal on a line 98 which is applied to an input of an adder 100.

A velocity command generator 102 produces a programmed velocity signal in adder 100 to generate a velocity error signal on line 30. Velocity command generator 102 receives a mode signal which establishes one of the selectable operating modes. A home program enable mode produces a velocity command which executes the home search program previously described. A point-to-point velocity command is effective to apply a selectable maximum acceleration to table 12 and then to apply a deceleration program which moves table 12 close to its commanded position and then produces a reduced velocity signal for inching toward the final commanded position.

Figure 8:
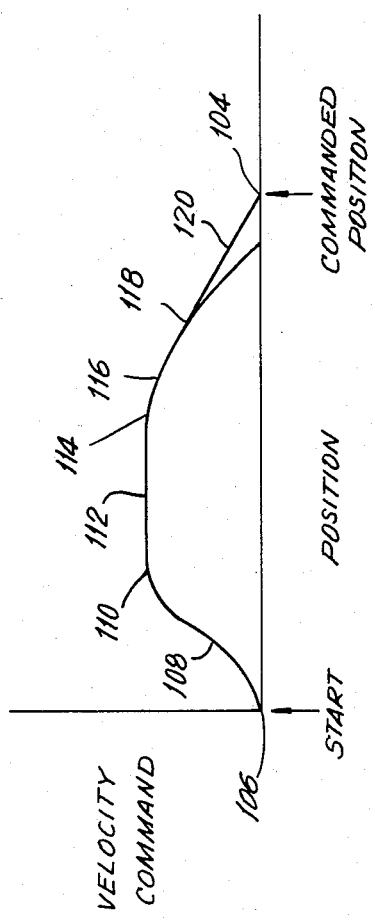
FIG. 8 is a curve to which reference will be made in describing a point-to-point positioning mode.

Referring to FIG. 8, there is shown the relationship between the velocity command and table position in a point-to-point positioning mode. The commanded position is shown at 104 and a starting position is shown at 106. An increasing velocity initial portion 108 begins at start position 106 and ends in a transition point 110 to a maximum velocity plateau 112. Increasing velocity portion 108 and transition point 110 may be limited to a predetermined acceleration such as, for example, G/4 to G/32. As positioning table 12 approaches commanded position 104 at a transition point 114, a deceleration program is begun over a decreasing velocity portion 116. Although any convenient decreasing velocity profile may be employed, in the preferred embodiment, decreasing velocity portion 116 may be programmed according to the square root of the difference between the commanded position supplied by system controller 24 (FIG. 1) and the actual position $P_N$ from position processor 34.

Referring again to FIG. 8, this programmed velocity decrease continues to a further transition point 118 which may be located a fixed distance away from commanded position 104. A final linear velocity decrease region 120 is defined between transition point 118 and commanded position 104 during which the velocity is decreased linearly with the difference between commanded and actual positions. That is, the velocity is equal to the difference between commanded and actual positions divided by a constant $K_1$. The value of constant $K_1$ may be analytically or empirically determined for stability and convergence at commanded position 104 without overshoot or oscillation. The size of linear velocity decrease region 120 may be selected by one skilled in the art for smooth transition and oscillation-free termination at commanded position 104. In the preferred embodiment, a linear velocity decrease region amounting to about 192 position counts (0.003 inches for a 500 lines per inch scale and 128 phase positions per line) is employed. For shock-free transition, linear velocity decrease region 120 is tangential to decreasing velocity portion 116.

When velocity command generator 102 is operated in the interpolate mode, it receives a program of desired velocity DV as well as a commanded position DP. By employing a programmed velocity profile, system controller 24 may synchronize the motion of many axes as required in a multi-axis system.

Velocity command generator 102 produces a velocity command $V_C$ as follows:

$$V_C = DV + \frac{DP - P_N}{K_2}$$

Where:
DV=desired velocity
DP=desired position
$P_N$=measured position.

Velocity command $V_C$ is corrected for bias in a velocity bias compensator 122 and the bias-corrected value is applied to an input of adder 100. The difference between the corrected tach signal and the corrected velocity command signal is the velocity error which is transmitted on line 30 to amplifier 32 (FIG. 1).

Velocity bias compensator 122 receives an initialize command at the beginning of operation. The initialize command is produced at a time when velocity command generator produces a velocity command signal $V_C$ requiring a zero table velocity. The corrected tach signal on line 98 is also fed to velocity bias compensator 122 and, if the corrected tach signal indicates that any motion is produced by the zero velocity command signal, velocity bias compensator 122 generates and stores a value which, when added to velocity command signal $V_C$, completely stops the motion. Thereafter, during normal operation, the stored velocity bias value is added to, or subtracted from, all ensuing velocity command signals $V_C$. Thus, velocity bias errors are removed from velocity command signal $V_C$ during operation of the system.

Figure 9:
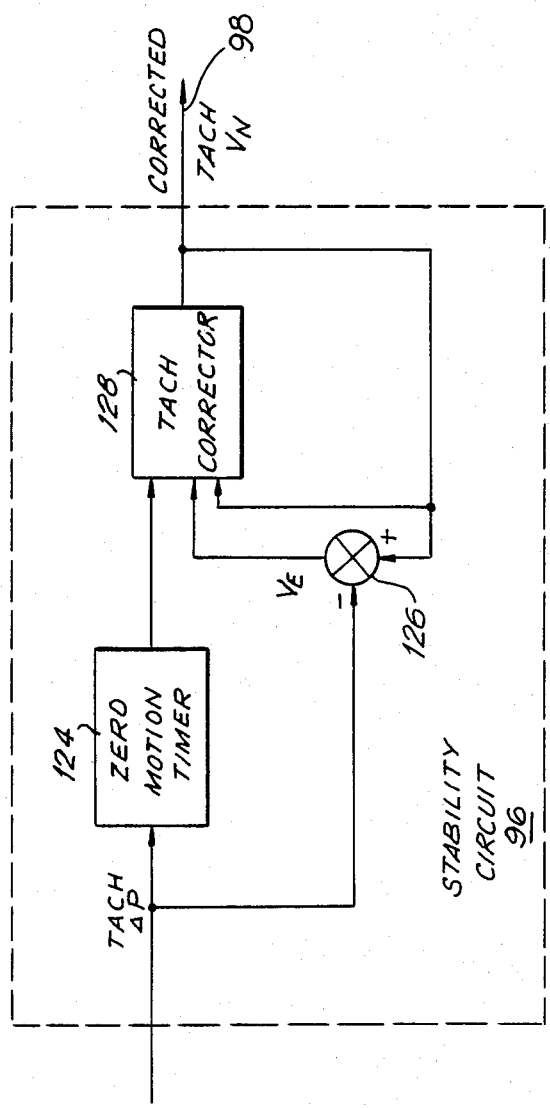
FIG. 9 is a block diagram of a stability circuit of FIG. 7.

Referring now to FIG. 9, stability circuit 96 is provided to deal with motion of positioning table 12 which is so slow that the resolution of position processor 34 is insufficient to detect a change in position over two or more measurement periods. That is, tach signal $\Delta P$ in FIG. 9 remains zero for one or more cycles. Without stability circuit 96, as soon as motion of positioning table 12 has changed enough so that position processor 34 can produce a tach signal $\Delta P$, positioning table 12 would be suddenly shifted one increment of position. Stability circuit 96 smooths this motion by slowing down the response of the system whenever zero motion is detected for one or more complete cycles of the system.

A zero motion timer 124 counts the number of system cycles during which tach signal $\Delta P$ remains zero, indicating that any change in table position is less than the resolution capability of position processor 34. Tach signal $\Delta P$ is also applied to a minus input of an adder 126. The output of adder 126 is applied to an input of a tach corrector 128. The output of zero motion timer 124, indicating the number of cycles during which no motion was resolved, is also applied to an input of tach corrector 128. The output of tach corrector 128, the corrected tach signal $V_N$, is applied on line 98 to adder 100 (FIG. 7) as well as being applied to a plus input of adder 126 and fed back to an input of tach corrector 128. Tach corrector 128 reduces the influence of the difference signal from adder 126 in producing a new corrected tach signal $V_N$ according to the number of cycles during which no motion was detected by zero motion timer 124. That is, the corrected tach signal $V_N$ is calculated as follows:

$$V_N = \frac{V_E}{f(T)} + V_{N-1}$$

Where:
$V_E$=Tach error from adder 126
$V_{N-1}$=Corrected tach in previous cycle
T=Number of system cycles during which no table motion is resolved.

It will be clear from the foregoing equation that, if f(T) is equal to 1, the old corrected tach signal $V_{N-1}$ is immediately corrected with the value of tach error to produce a new corrected tach $V_N$. The following table gives the relationship between T and f(T).

| T | f(T) |
|---|------|
| 0 | 1 |
| 1 | 2 |
| 2 | 4 |
| 3 | 4 |
| 4 | 8 |
| 5 | 8 |
| 6 | 8 |
| 7 | 8 |
| 8 | 16 |
| 9 | |
| 10 | |
| 11 | |
| 12 | |
| 13 | |
| 14 | |
| 15 | |

If motion is rapid enough so that a change in table position is discriminated in less than one cycle time (T=0), f(T) is set equal to 1. When one or more complete cycles are counted before motion is discriminated, f(T) is greater than 1. For example, if motion remains undetected for seven cycles and then a single increment of motion is sensed, the velocity error $V_E$ is divided by 8 before being combined with the correct tach from the previous cycle $V_{N-1}$. In this way, the single increment of detected motion is smoothed in its application to correct a tach signal $V_N$ over the succeeding eight cycles. If motion remains undiscriminated for eight or more cycles, f(T) is set at 16.

The apparatus described hereinabove may be implemented by one skilled in the art using any appropriate digital or analog devices including integrated or discrete components. In the preferred embodiment, axis controller 22 is preferably implemented using a digital processor and most preferably using a programmed microprocessor.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. A position processor for a robotic controller of the type employing first and second sensed position signals having a phase relationship, said phase relationship containing information about a position of an object within a cycle of position, said object being movable over a plurality of cycles of position, comprising:
   means for comparing phases of said first and second sensed position signals to produce a reported position within a cycle of position;
   means for producing a predicted position of said object including full cycles of position and a position within a cycle of position;
   means for differencing said predicted position within a cycle of position and said reported position to produce a position error signal; and
   means responsive to said position error signal for accumulating a smoothed position signal representing said position of said object.

2. A position processor according to claim 1, wherein said means for comparing phases includes means for compensating for bias in said first and second sensed position signals.

3. A position processor according to claim 2, wherein said means for compensating for bias includes an automatic bias calibrator effective to sense and store first and second values of bias in said first and second sensed position signals at a predetermined reference condition and first and second bias compensators, said first and second bias compensators being effective thereafter to compensate said first and second sensed position signals based on said first and second values of bias.

4. A position processor according to claim 1, wherein said means for predicting a position includes means responsive to said position error signal for accumulating a velocity signal and a predicted position calculator responsive to said smoothed position signal and said velocity signal for producing said predicted position.

5. A position processor according to claim 4, wherein said means for predicting a position includes a reasonableness test circuit effective to produce a position failure signal in response to a predetermined consecutive number of said position error signal exceeding a predetermined value.

6. A position processor according to claim 5, wherein said predetermined consecutive number is at least two.

7. A position processor according to claim 1 or 4, wherein said means for accumulating a smoothed position signal includes a ratio circuit effective to divide said position error signal by a predetermined value before employing it to accumulate said smoothed position signal.

8. A position processor according to claim 4, wherein said means for accumulating a velocity includes a ratio circuit effective to divide said position error signal by a predetermined value before employing it to accumulate said velocity signal.

9. A position processor according to claim 1, wherein said position processor is a digital computer.

10. A position processor according to claim 1, wherein said object is a positioning table, said position is a linear position along an axis of motion of said positioning table, said first and second sensed position signals being cyclically repeated as said positioning table is displaced along said axis.

11. A command processor for a robotic controller of the type employing a sequence of measurements of position of an object, said measurements being spaced apart a predetermined time, comprising:
   means for differencing a measurement of position and a preceding measurement of position to produce a measured velocity signal;
   means for producing a velocity command signal;
   means for differencing said measured velocity signal and said velocity command signal to produce a velocity error signal, said velocity error signal being usable for driving said object;
   means for counting a number of consecutive ones of said predetermined times during which said measured velocity signal is zero; and
   means for slowing change of said measured velocity signal in dependence on said number.

12. A command processor according to claim 11, wherein said means for slowing a change employs a relationship $$V_N = \frac{V_E}{f(T)} + V_{N-1}$$

Where:
   $V_N$ is measured velocity signal at a present time
   $V_{N-1}$ is measured velocity signal at a preceding time
   $V_E$ is a difference between $V_N$ and $V_{N-1}$
   T is a number of consecutive preceding predetermined times during which $V_N$ is zero
   f(T) is a function which increases with T.

13. A command processor for a robotic controller of the type employing a sequence of measurements of position of an object, said measurements being spaced apart a predetermined time, comprising:
   means for differencing a measurement of position and a preceding measurement of position to produce a measured velocity signal;
   means for producing a velocity command signal;
   means for differencing said measured velocity signal and said velocity command signal to produce a velocity error signal, said velocity error signal being usable for driving said object; and
   a velocity bias compensator effective to sense and store a non-zero value of said measured velocity signal at a time when said velocity command signal should be zero and to subsequently compensate said velocity command signal with the stored value to compensate for velocity bias.

14. A home position processor for a robotic controller of the type employing a home position signal for sensing a home position of an object, comprising:
   means for moving said object through a search range containing said home position;
   means for storing an extreme value of said home position signal;
   means for comparing a new value of said home position signal with a previously stored extreme value and for replacing said previously stored extreme value with said new value if said new value exceeds said previously stored extreme value; and
   means for storing a number associated with a position of each new value which is stored, a number stored at the completion of said search range being associated with the most extreme value of said home position signal and representing said home position.

15. A method of determining a home position in a robotic controller of the type employing a home position signal for sensing a home position of an object, compris- ing:
   moving said object through a search range containing said home position;
   storing an extreme value of said home position signal;
   comparing a new value of said home position signal with a previously stored extreme value and replacing said previously stored extreme value with said new value if said new value exceeds said previously stored extreme value; and
   storing a number associated with a position of each new value which is stored, a number stored at the completion of said search range being associated with the most extreme value of said home position signal and representing said home position.

16. A robotic controller for controlling a position of an object, comprising:
   means for producing first and second position signals related to said position, said first and second position signals having a phase relationship containing information about said position;
   means responsive to said phase relationship and effective to produce a reported position signal within a cycle of said first and second position signals;
   means for producing a prediction of said reported position signal;
   means for differencing said reported position signal and said prediction to produce a position error signal;
   said means for producing a prediction being responsive to said position error signal for updating said prediction;
   means responsive to said error signal for accumulating a smoothed position signal;
   means for differencing a value of said smoothed position signal with a previous value of said smoothed position signal to produce a tach signal;
   means for slowing changes in said tach signal in response to at least two successive values of said smoothed position signal being the same to produce a corrected tach signal;
   means for producing a velocity command signal;
   means for differencing said velocity command signal and said corrected tach signal to produce a velocity error signal; and
   means responsive to said velocity error signal for driving said object.

17. A robotic controller according to claim 16, wherein said means responsive to said phase relationship includes an automatic bias calibrator effective to store first and second bias values related to said first and second position signals and first and second bias compensators responsive respectively to said first and second bias values for removing bias from said first and second position signals.

18. A robotic controller according to claim 16, wherein said means for producing a velocity command signal includes velocity compensation means for detecting motion of said object when zero motion is commanded and for storing a bias value effective to stop said motion, said velocity compensation means being effective to apply said bias value to all subsequent values of said velocity command signal whereby velocity bias is compensated.

* * * * *